United States Patent
Park

(10) Patent No.: US 7,697,083 B2
(45) Date of Patent: Apr. 13, 2010

(54) LIQUID CRYSTAL DISPLAY (LCD) DEVICE HAVING AN ELECTROSTATIC DISCHARGE PROTECTION CIRCUIT AND A HIGH VOLTAGE SUPPLY CIRCUIT

(75) Inventor: Chul-Woo Park, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 1182 days.

(21) Appl. No.: 11/280,293

(22) Filed: Nov. 17, 2005

(65) Prior Publication Data

US 2006/0109392 A1    May 25, 2006

(30) Foreign Application Priority Data

Nov. 24, 2004    (KR) .................. 10-2004-0097176

(51) Int. Cl.
  *G02F 1/1333*    (2006.01)
(52) U.S. Cl. .......................................................... 349/40
(58) Field of Classification Search ................... 349/33, 349/40
  See application file for complete search history.

(56) References Cited

U.S. PATENT DOCUMENTS

| 5,373,377 | A | 12/1994 | Ogawa et al. | |
|---|---|---|---|---|
| 2002/0057247 | A1* | 5/2002 | Lee et al. | 345/88 |
| 2003/0117359 | A1 | 6/2003 | Park | |

FOREIGN PATENT DOCUMENTS

| CN | 1396656 A | 2/2003 |
|---|---|---|
| CN | 1506736 A | 6/2004 |
| JP | 07-056191 | 3/1995 |
| JP | 2002-278524 | 9/2002 |
| JP | 2002-303849 | 10/2002 |
| JP | 2004-046235 A | 2/2004 |
| KR | 10-2004-0001177 | 1/2004 |

OTHER PUBLICATIONS

Korean Office action for Korean patent application No. 10-2004-0097176 issued on Jul. 25, 2006.
Office Action from the Japanese Patent Office issued in Applicant's corresponding Japanese Patent Application No. 2005-158747 dated Jul. 8, 2008.
Chinese Certificate of patent issued on Nov. 26, 2008 in corresponding Chinese Patent Application No. 200510126845.6.

* cited by examiner

*Primary Examiner*—David Nelms
*Assistant Examiner*—Nathanael R Briggs
(74) *Attorney, Agent, or Firm*—Robert E. Bushnell, Esq.

(57) ABSTRACT

A Liquid Crystal Display (LCD) device having an Optically Compensated Bend (OCB) mode, which can restrict an initial high current while supplying a high voltage to a liquid crystal, includes: pixel circuits formed at crossing points of a plurality of scan lines and a plurality of data lines and including an Liquid Crystal (LC) capacitor of an OCB mode formed between a pixel electrode and a common electrode; an Electrostatic Discharge (ESD) protection circuit connected to each data line to prevent static electricity from accumulating in each pixel circuit; a DC-DC converter outputting a voltage for initial bend transition of the LC capacitor of the OCB mode; and a high voltage supplying circuit receiving a voltage of the DC-DC converter and transmitting a high voltage to the common electrode. An initial high current is prevented from flowing through the LC panel to thereby protect the LC panel and other elements from damage, and an initial bend transient time of the OCB mode liquid crystal is significantly reduced.

16 Claims, 6 Drawing Sheets

$V_{dc} < V_{ESD}$ $V_{dc} > V_{ESD}$

LIQUID CRYSTAL DISPLAY (LCD) DEVICE HAVING AN ELECTROSTATIC DISCHARGE PROTECTION CIRCUIT AND A HIGH VOLTAGE SUPPLY CIRCUIT

CLAIM OF PRIORITY

This application makes reference to, incorporates the same herein, and claims all benefits accruing under 35 U.S.C. §119 from an application for LIQUID CRYSTAL DISPLAY DEVICE earlier filed in the Korean Intellectual Property Office on 24 Nov. 2004 and there duly assigned Serial No. 10-2004-0097176.

BACKGROUND OF THE INVENTION

1. Field of the Invention

The present invention relates to a Liquid Crystal Display (LCD) device, and more particularly, to an LCD device having an Optically Compensated Bend (OCB) mode which prevents an initial high current while supplying a high voltage to a liquid crystal.

2. Description of the Related Art

An LCD device is thin, lightweight, and low in power consumption compared to a Cathode Ray Tube (CRT), and has also less electromagnetic wave emission. Thus, LCD devices have been widely used as displays of portable information devices such as cellular phones, computers, and Personal Digital Assistants (PDAs).

However, an LCD device has different brightness and color according to the angle at which it is observed, and thus has a narrow viewing angle. Various ways of resolving this viewing angle problem have been suggested.

For example, in order to improve the viewing angle range of an LCD device, one technique arranges a prism plate on a light guide panel to improve the straightness of light emitted from a back light, so that the brightness in a vertical direction is improved more than 30%. Also, another technique provides a negative compensation film to improve the viewing angle range.

Furthermore, an In Plane Switching mode has been developed to achieve a wide viewing angle of 160°, which is almost the same as that of a CRT. However, this technique results in a low aperture ratio and thus needs further improvement.

Moreover, in order to improve the viewing angle range, Thin Film Transistor (TFT) driving techniques including an Optically Compensated Bend (OCB) mode, a Polymer Dispersed Liquid Crystal (PDLC) mode, a Deformed Helix Ferro-electric (DHF) mode, and so on, have been suggested.

In particular, the OCB mode has been the focus of considerable research and development efforts because it has a rapid liquid crystal response speed and a wide viewing angle.

An initial orientation state of a liquid crystal arranged between an upper plate electrode and a lower plate electrode is a homogeneous state, and when a predetermined voltage is supplied across the upper and lower plate electrodes, the liquid crystal state changes via a transient splay and an asymmetric splay into a bend state and then operates in an OCB mode.

Liquid crystal molecules in a central portion of a liquid crystal layer are left-and-right symmetrically arranged, and thus a tilt angle is 0° at less than a predetermined voltage and 90° at more than the predetermined voltage. A high voltage is initially supplied, so that the tilt angle of the liquid crystal molecules in the central portion of the liquid crystal layer becomes 90°, and then the supplied voltage is varied to change the tilt angle of liquid crystal molecules not in the central portion of the liquid crystal layer, thereby modulating the polarization of light passing through the liquid crystal layer.

It takes tens of seconds to arrange the tilt angle of the liquid crystal molecules in the central portion from 0° to 90°, and a response time is as fast as 10 µm since there is no back flow and a big bending transformation has a large elastic modulus.

When the OCB mode is in an ON state, conversion from the transient splay to the asymmetric splay is fast, and conversion from the transient splay to the bend state is relatively fast, but conversion from the asymmetric splay to the bend state is slow.

When the OCB mode is in an OFF state, conversion to the homogeneous state is slow but conversion from the transient splay to the homogeneous state or from the asymmetric splay to the homogeneous state is fast.

As described above, there is a problem in that a predetermined time (hereinafter, a "transient time") passes before the bend orientation for the OCB mode is obtained. Therefore, an LCD device often supplies an initial high voltage to a common electrode of the liquid crystal in order to reduce the transient time in the OCB mode.

SUMMARY OF THE INVENTION

The present invention provides a Liquid Crystal Display (LCD) device which can supply a high voltage across a liquid crystal to reduce an Optically Compensated Bend (OCB) initial bend transient time and restrict an initial spark-like current from flowing through a Liquid Crystal (LC) panel or a pixel circuit.

In an exemplary embodiment of the present invention, a liquid crystal display device includes: pixel circuits formed at crossing points of a plurality of scan lines and a plurality of data lines and including an LC capacitor of an OCB mode formed between a pixel electrode and a common electrode; an Electrostatic Discharge (ESD) protection circuit connected to the data lines to prevent static electricity from accumulating in the pixel circuits; a DC-DC converter outputting a voltage for initial bend transition of the LC capacitor of the OCB mode; and a high voltage supplying circuit receiving a voltage of the DC-DC converter and transmitting a high voltage to the common electrode.

The high voltage supplying circuit can include a capacitor charging according to a voltage output from the DC-DC converter; and a transistor outputting a current that varies according to a voltage charged in the capacitor.

The high voltage supplying circuit can further include a resistor connected between the DC-DC converter and the capacitor.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
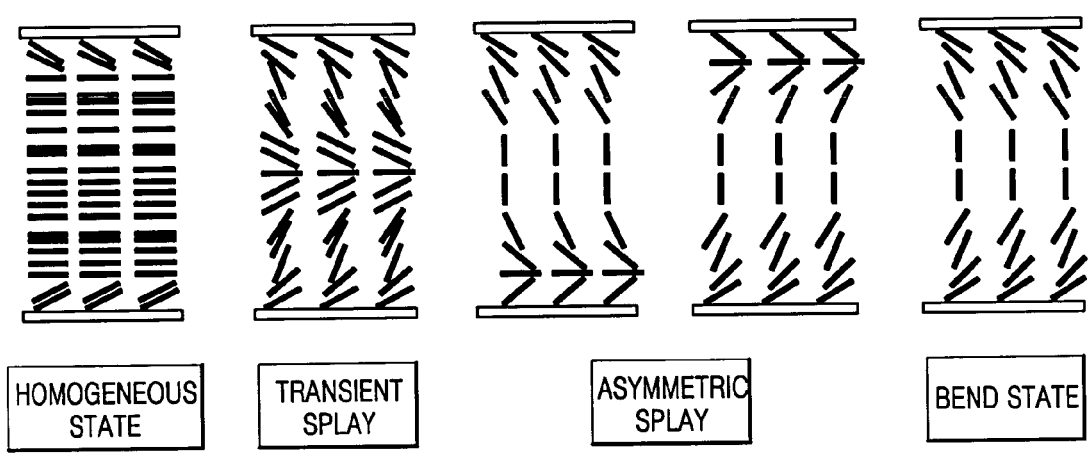
FIG. 1 is a view of liquid crystal states to describe the operation of an Optically Compensated Bend (OCB) mode.

FIG. 1 is a view of liquid crystal states to describe the operation of an Optically Compensated Bend (OCB) mode. Referring to FIG. 1, an initial orientation state of a liquid crystal arranged between an upper plate electrode and a lower plate electrode is a homogeneous state, and when a predetermined voltage is supplied across the upper and lower plate electrodes, the liquid crystal state changes via a transient splay and an asymmetric splay into a bend state and then operates in an OCB mode.

As shown in FIG. 1, an OCB mode liquid crystal cell has a tilt angle of about 10° to 20°, a thickness of about 4 μm to 7 μm, and an orientation film is rubbed in the same direction.

Liquid crystal molecules in a central portion of a liquid crystal layer are left-and-right symmetrically arranged, and thus a tilt angle is 0° at less than a predetermined voltage and 90° at more than the predetermined voltage. A high voltage is initially supplied, so that the tilt angle of the liquid crystal molecules in the central portion of the liquid crystal layer becomes 90°, and then the supplied voltage is varied to change the tilt angle of liquid crystal molecules not in the central portion of the liquid crystal layer, thereby modulating the polarization of light passing through the liquid crystal layer.

It takes tens of seconds to arrange the tilt angle of the liquid crystal molecules in the central portion from 0° to 90°, and a response time is as fast as 10 μm since there is no back flow and a big bending transformation has a large elastic modulus.

When the OCB mode is in an ON state, conversion from the transient splay to the asymmetric splay is fast, and conversion from the transient splay to the bend state is relatively fast, but conversion from the asymmetric splay to the bend state is slow.

When the OCB mode is in an OFF state, conversion to the homogeneous state is slow but conversion from the transient splay to the homogeneous state or from the asymmetric splay to the homogeneous state is fast.

As described above, there is a problem in that a predetermined time (hereinafter, a "transient time") passes before the bend orientation for the OCB mode is obtained. Therefore, an LCD device often supplies an initial high voltage to a common electrode of the liquid crystal in order to reduce the transient time in the OCB mode.

Figure 2:
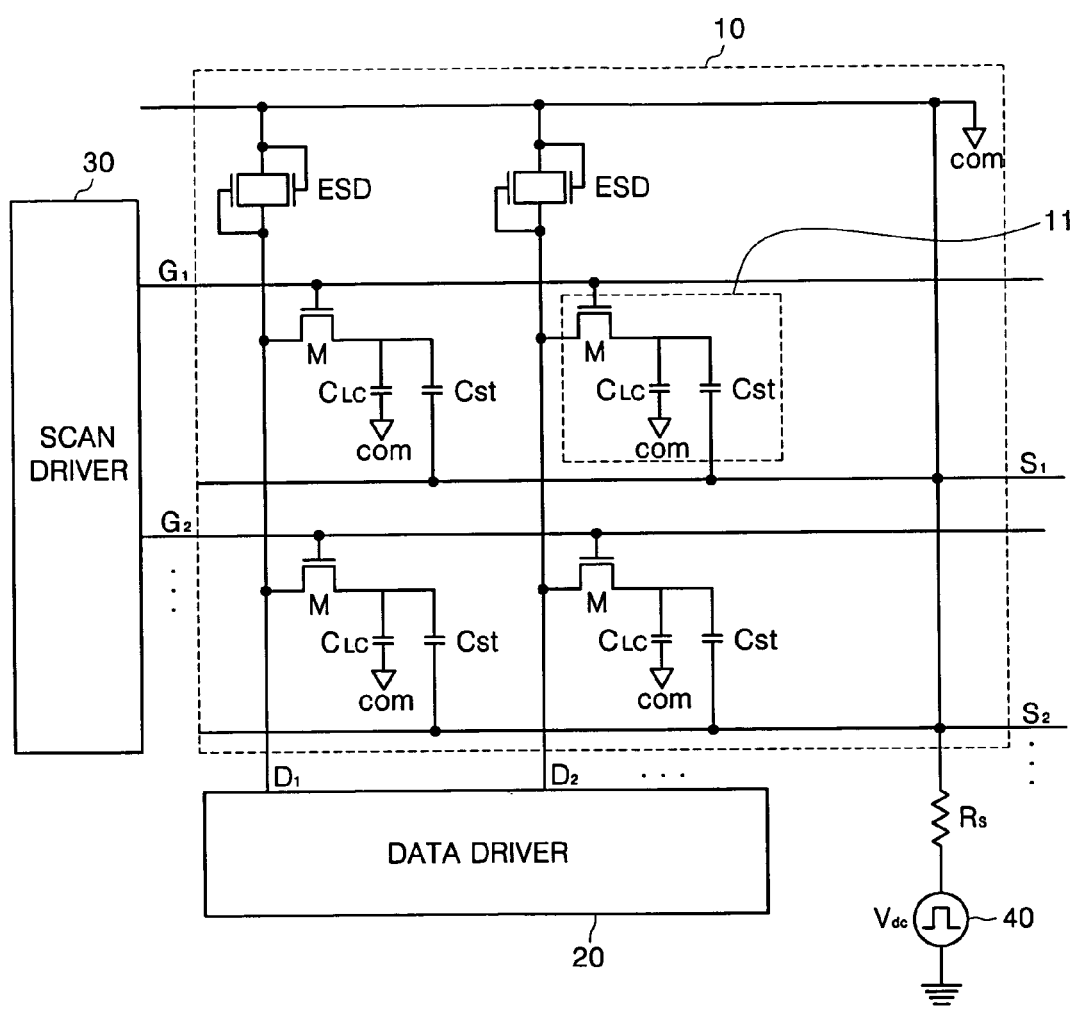
FIG. 2 is a block diagram of a Liquid Crystal Display (LCD) device having an OCB mode.

FIG. 2 is a block diagram of a Liquid Crystal Display (LCD) device having the OCB mode. Referring to FIG. 2, the LCD device having the OCB mode includes a Liquid Crystal (LC) panel 10, a data driver 20, a scan driver 30, and a DC-DC converter 40.

The LC panel 10 includes a plurality of pixel circuits 11 formed at crossing points of a plurality of scan lines G1, G2, . . . , and a plurality of data lines D1, D2, . . . .

Each pixel circuit 11 includes a switching transistor M, an LC capacitor $C_{LC}$, and a storage capacitor $C_{st}$. A source of the switching transistor M is connected to the data line D2, and a gate of the switching transistor M is connected to the scan line G1. The switching transistor M is turned on in response to a gate voltage and transmits a data voltage to the LC capacitor $C_{LC}$. The LC capacitor $C_{LC}$ is comprised of a pixel electrode, a common electrode COM, and an OCB mode LC layer between the pixel electrode and the common electrode, and the data voltage transmitted through the switching transistor M is supplied to the pixel electrode. The storage capacitor $C_{st}$ is connected in parallel to the LC capacitor $C_{LC}$ to store the data voltage during one frame.

The data driver 20 supplies the data voltage to the pixel circuit 11 via a plurality of data lines D1, D2, . . . , and the scan driver 30 supplies the gate voltage to the gate of the switching transistor M via a plurality of scan lines G1, G2 . . . .

The DC-DC converter 40 is used to supply an initial high voltage to the common electrode COM of the liquid crystal. The DC-DC converter 40 boosts a voltage from a power source (not shown) and supplies the boosted voltage to the common electrode COM via the storage lines S1, S2, . . . . The DC-DC converter 40 supplies a high voltage via a resistor $R_s$ connected in series thereto. The resistor $R_s$ serves to restrict a spark-like high current which flows at the moment a high voltage is supplied due to parasitic capacitance between the common electrode COM and the data line Dm.

An Electro Static Discharge (ESD) protection circuit is connected between the storage lines S1, S2, . . . and the data lines D1, D2, . . . to protect the device from an electrostatic discharge. The ESD protection circuit serves to discharge static electricity which can accumulate during an LCD manufacturing process without degrading characteristics of elements such as TFTs and wire lines. The ESD protection circuit is turned on at a voltage of more than a predetermined level, e.g., 10 volts, and while turned on is modeled as a resistor whose resistance value depends on the magnitude of the supplied voltage.

In the LCD device having the OCB mode described above, for the sake of the initial bend transition in the OCB mode, the DC-DC converter 40 supplies a high voltage $V_{dc}$ of 15 to 30 volts to the common electrode COM via the serial resistor $R_s$ while the data lines D1, D2, . . . are connected to ground, to supply a high voltage to the liquid crystal. In more detail, a high voltage $V_{dc}$ of the DC-DC converter 40 is reduced to a predetermined level by the serial resistor $R_s$ to be supplied to the ESD protection circuit, and then the voltage supplied to the ESD protection circuit is supplied to the liquid crystal.

Figure 3A:
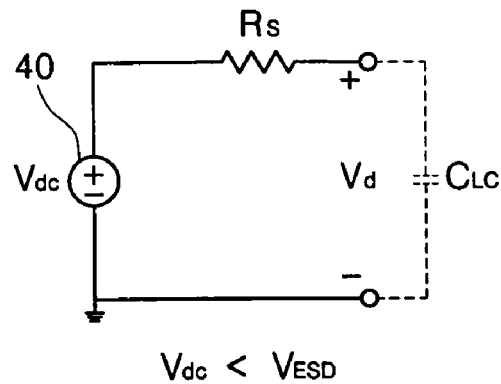
FIGS. 3A and 3B are equivalent circuit diagrams of states of an Electrostatic Discharge (ESD) protection circuit according to the voltage output of a DC-DC converter of FIG. 2.
Figure 3B:
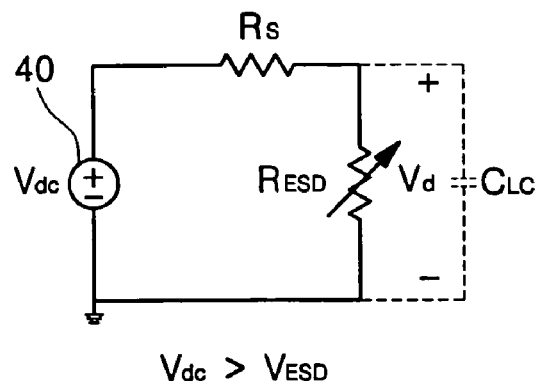

FIGS. 3A and 3B are equivalent circuit diagrams of the states of the ESD protection circuit according to the output voltage amplitude of the DC-DC converter of FIG. 2.

FIG. 3A is an equivalent circuit diagram of a state of the ESD protection circuit when the high voltage output $V_{dc}$ of the DC-DC converter 40 is smaller than a turn-on voltage of the ESD protection circuit. The ESD protection circuit is turned off so that the entire high voltage $V_{dc}$ is supplied to the liquid crystal $C_{LC}$.

FIG. 3B is an equivalent circuit diagram of a state of the ESD protection circuit ESD when the high voltage $V_{dc}$ of the DC-DC converter 40 is greater than a turn-on voltage of the ESD protection circuit. The ESD protection circuit is turned on so that only part of the high voltage $V_{dc}$ is supplied to the liquid crystal $C_{LC}$. The relationship between a voltage $V_d$ supplied to the liquid crystal $C_{LC}$ and the high voltage $V_{dc}$ of the DC-DC converter 40 is given by the following equation:

$$V_d = \frac{R_{ESD}}{R_{ESD} + R_S} V_{dc} \qquad \text{Equation 1}$$

where $R_s$ denotes the resistance of the serial resistor, and $R_{ESD}$ denotes a non-linear resistance of the ESD protection circuit when it is turned on.

As can be seen in Equation 1, when the high voltage output supplied by the DC-DC converter 40 is held constant, as the resistance $R_s$ of the serial resistor decreases, the voltage supplied to the liquid crystal increases. However, if $R_s$ is too small, a high current can flow at the moment a voltage is supplied, damaging the pixel circuit and the LC panel.

The purpose of supplying a high voltage to the liquid crystal is to reduce the initial bend transient time of the OCB mode of the liquid crystal, and supplying as high a voltage as possible can improve the characteristics of the LCD device in the OCB mode. However, since the phenomenon shown in FIGS. 3A-3B occurs frequently in practice, there is need for a circuit that can both restrict an initial current and minimize the reduction of the supplied voltage by the resistor $R_s$.

The present invention is described more fully below with reference to the accompanying drawings, in which embodiments of the present invention are shown.

Figure 4:
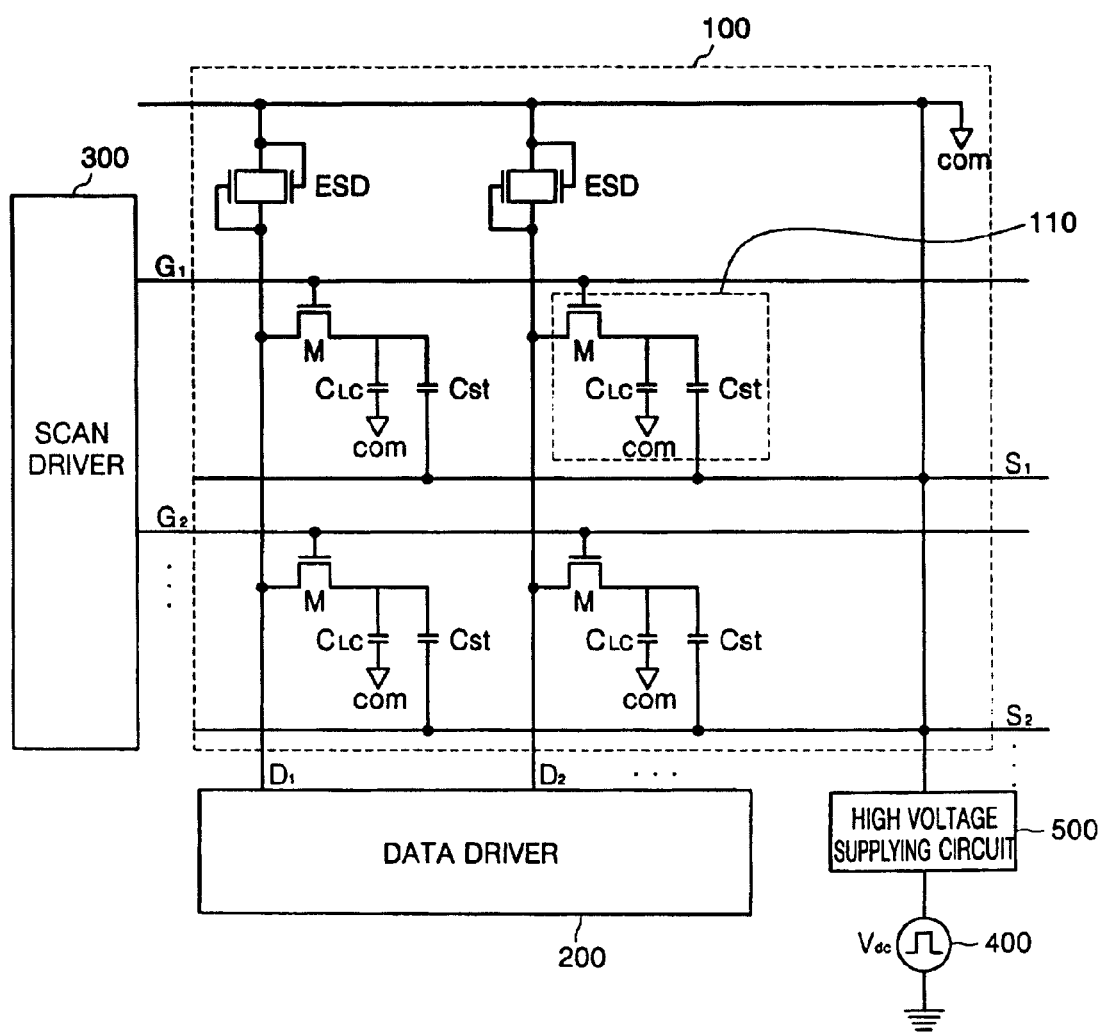
FIG. 4 is a block diagram of an LCD device having an OCB mode according to an embodiment of the present invention.

FIG. 4 is a block diagram of an LCD device having an OCB mode according to an embodiment of the present invention.

Referring to FIG. 4, the LCD device having the OCB mode includes an LC panel 100, a data driver 200, a scan driver 300, and a DC-DC converter 400.

The LC panel 100 includes a plurality of pixel circuits 110 formed at crossing points of a plurality of scan lines G1, G2, . . . , and a plurality of data lines D1, D2 . . . . Since a high voltage is initially supplied to the liquid crystal molecules of the OCB mode in the LC panel 100, liquid crystal molecules in a central portion of the liquid crystal layer can be rapidly tilted to an angle of 90°.

Each pixel circuit 110 includes a switching transistor M, an LC capacitor $C_{LC}$, and a storage capacitor $C_{st}$. A source of the switching transistor M is connected to the data line D2, and a gate of the switching transistor M is connected to the scan line G1. The switching transistor M is turned on in response to a selection voltage and transmits a data voltage to the LC capacitor $C_{LC}$. The LC capacitor $C_{LC}$ is comprised of a pixel electrode, a common electrode COM, and an OCB mode LC layer between the pixel electrode and the common electrode COM, and the data voltage transmitted through the switching transistor M is supplied to the pixel electrode. The storage capacitor $C_{st}$ is connected in parallel to the LC capacitor $C_{LC}$ to store the data voltage during one frame.

The data driver 200 supplies the data voltage to the pixel circuit 110 via the plurality of data lines D1, D2, . . . , and the scan driver 300 supplies the selection voltage to the gate of the switching transistor M via the plurality of scan lines G1, G2, . . . .

The DC-DC converter 400 is used to supply an initial voltage to the common electrode COM of the liquid crystal. Specifically, the DC-DC converter 400 boosts a voltage from a power source (not shown) and supplies the boosted voltage to the common electrode COM formed on an upper substrate via storage lines S1, S2, . . . formed on a lower substrate. The storage lines S1, S2, . . . and the common electrode COM are connected by silver (Ag) at a portion of the LC panel.

An ESD protection circuit is connected between the storage lines S1, S2 . . . and the data lines D1, D2, . . . for electrostatic discharge. The ESD protection circuit serves to discharge static electricity which can accumulate during an LCD manufacturing process without degrading the characteristics of elements such as TFTs and wire lines. The ESD protection circuit serves as a non-linear resistor in which two diodes, formed by connecting a gate and a drain of the TFT, are connected in opposite directions. That is, the ESD protection circuit can be turned on or off according to the magnitude of a high voltage $V_{dc}$ of the DC-DC converter 400. Specifically, the ESD protection circuit can be turned on by a voltage of more than 10 volts, in which case it is modeled as a non-linear resistor whose resistance varies according to supplied voltage.

The LCD device having the OCB mode according to the present invention further includes a high voltage supplying circuit 500. The high voltage supplying circuit 500 is connected between the DC-DC converter 400 and the ESD protection circuit to both supply an initial high voltage to the liquid crystal and to restrict an initial spark-like current from flowing through the LC panel. For the sake of fast initial bend transition in the OCB mode liquid crystal, the DC-DC converter 400 supplies a high voltage $V_{dc}$ of 15 to 30 volts to the storage lines S1, S2, . . . and the common electrode COM via the high voltage supplying circuit 500, and the data lines D1, D2, . . . are connected to ground, to supply a high voltage to the liquid crystal. Thus, as shown in FIG. 4, the high voltage $V_{dc}$ is transmitted to the high voltage supplying circuit 500 and then is supplied to the ESD protection circuit connected to the data line.

Figure 5:
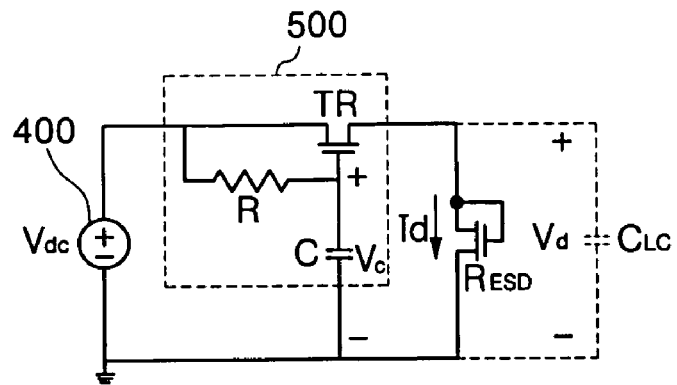
FIG. 5 is a circuit diagram of how a high voltage of a DC-DC converter is supplied to a high voltage supply circuit and an ESD protection circuit in an LCD device in accordance with the present invention.

FIG. 5 is a circuit diagram of how a high voltage of the DC-DC converter 400 is supplied to the high voltage supplying circuit 500 and the ESD protection circuit in the LCD device of an embodiment of the present invention.

The circuit diagram of FIG. 5 shows the DC-DC converter 400, the high voltage supplying circuit 500, and the ESD protection circuit.

The DC-DC converter 400 boosts and outputs a DC voltage supplied from a power source (not shown). The boosted DC voltage is preferably in the range of 15 to 30 volts.

The ESD protection circuit ESD is connected between the data line and the common electrode COM in parallel to the LC capacitor $C_{LC}$. Thus, a voltage between terminals, i.e., the common electrode COM and pixel electrode of the LC capacitor $C_{LC}$ is $V_d$.

The high voltage supplying circuit 500 includes a resistor R and a capacitor C which are configured to function as a Low Pass Filter (LPF), and a transistor TR with a resistance that varies according to a voltage charged in the capacitor C. In more detail, one end of the resistor R is connected to the DC-DC converter 400. One end of the capacitor C is connected in series to the other end of the resistor R and the other end of the capacitor C is connected to ground. One of source and drain electrodes of the transistor TR is connected to one end of the resistor R, and a gate electrode of the transistor TR is connected to one end of the capacitor C. The other of the source and drain electrodes of the transistor TR is commonly connected to the common electrode COM of the liquid crystal.

A current which flows through the transistor TR varies with a voltage supplied to the gate of the transistor TR, i.e., a voltage charged in the capacitor C. A voltage $V_c$ charged in the capacitor $C_{TR}$ is given by Equations 2 and 3:

$$V_C \frac{\frac{1}{SC}}{R + \frac{1}{SC}} \frac{V_{dc}}{s} = \left(\frac{1}{S} - \frac{1}{S + \frac{1}{RC}}\right) V_{dc} \qquad \text{Equation 2}$$

Equation 2 is a Laplace transform of a left circuit network of FIG. 5. It is assumed that there is no initial charge on the capacitor C. Also, if Equation 2 is an inverse Laplace transform, it is represented by Equation 3:

$$v_c(t) = (1 - e^{\frac{t}{RC}})V_{dc},  \quad \text{Equation 3}$$

where a time "t" is greater than "0", $V_{dc}$ denotes a voltage output from the DC-DC converter, and RC denotes a time constant t.

As can be seen in Equation 3, the voltage $V_c$ charged in the capacitor $C_{TR}$ is 0 volts at the initial stage of a voltage $V_{dc}$ supplied from the DC-DC converter and is charged to a level close to $V_{dc}$ during a normal state.

Therefore, since the charged voltage is 0 volts at the initial application of a voltage $V_c$, no substantial initial current flows through the transistor TR. Thus, an initial spark-like current resulting from application of high voltage is restricted. The transistor TR can be modeled as a resistor having a high resistance value.

Thereafter, since the voltage $V_c$ charged in the capacitor C is close to the voltage $V_{dc}$, the transistor TR is turned on so that the entire voltage $V_c$ is supplied to the ESD protection circuit and the common electrode COM of the liquid crystal, thereby reducing an initial transient time of the OCB mode liquid crystal. The transistor TR can be modeled as a resistor having a small resistance value.

Figure 6:
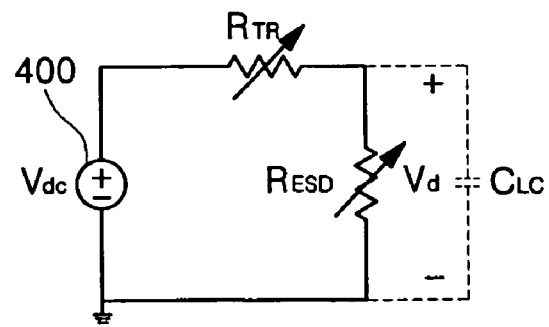
FIG. 6 is an equivalent circuit diagram of the circuit of FIG. 5.

FIG. 6 is an equivalent circuit diagram of the circuit of FIG. 5. Referring to FIG. 6, the circuit of FIG. 5 can be represented as an equivalent circuit in which an output voltage $V_{dc}$, a resistor $R_{TR}$, and a resistor $R_{ESD}$ are connected in series. The resistor $R_{TR}$ is an equivalent resistor of the transistor TR and is a variable resistor which has a high resistance at an initial application of a voltage $V_{dc}$ and thereafter has a low resistance. Therefore, even though a high voltage $V_{dc}$ is supplied so that the ESD protection circuit is turned on to serve as a resistor $R_{ESD}$, a resistance value of the variable resistor $R_{TR}$ becomes high to restrict a current spike at initial application of the high voltage $V_{dc}$. After the initial application of voltage, the resistance value of the variable resistor $R_{TR}$ becomes small to allow a high voltage to be supplied to the resistor $R_{ESD}$ and the common electrode COM.

Figure 7:
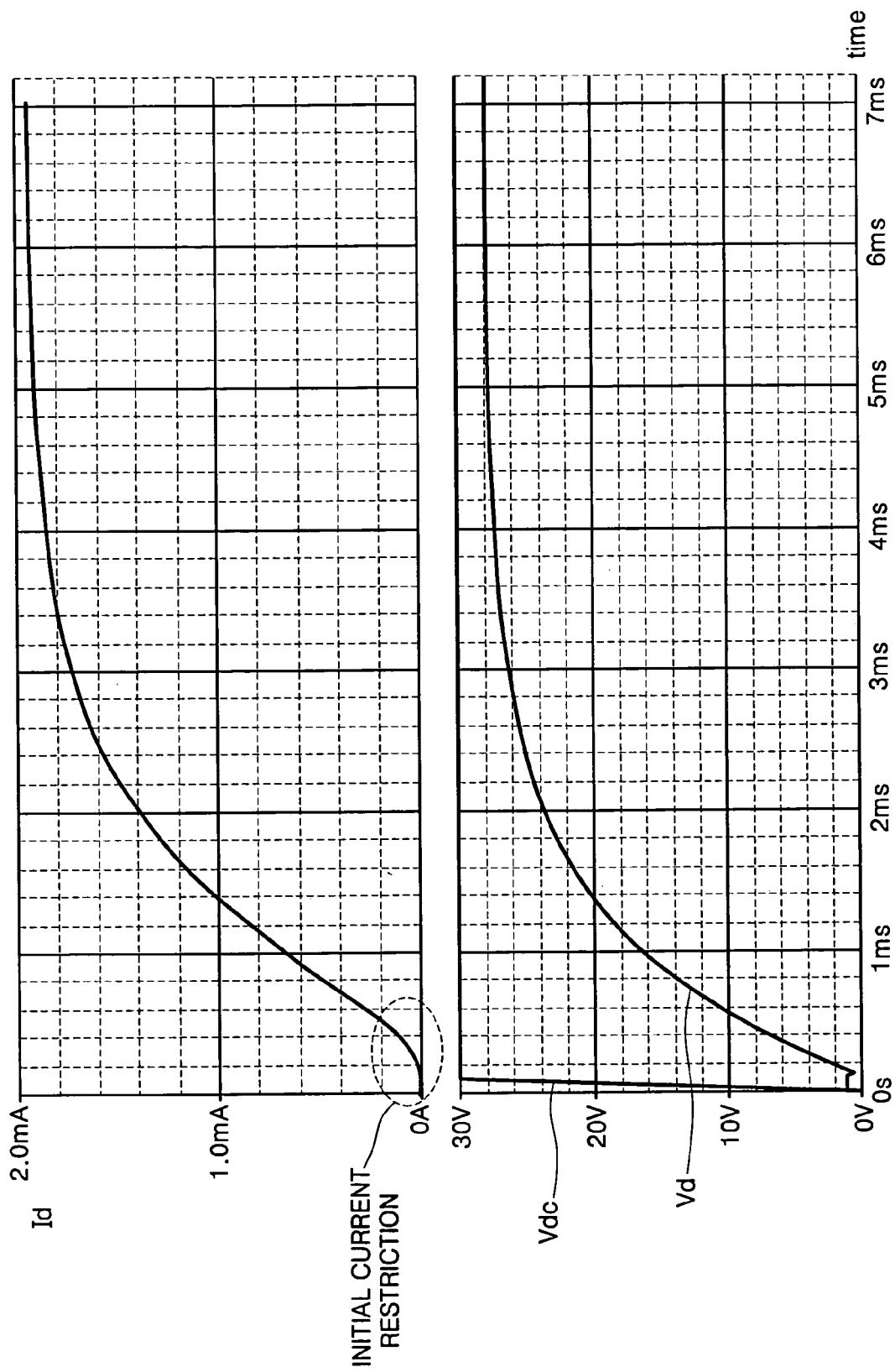
FIG. 7 is a pair of graphs of simulated current and voltage responses of the circuit of FIG. 5 when a high voltage is supplied by the DC-DC converter.

FIG. 7 is a pair of graphs showing simulated current and voltage response of the circuit of FIG. 5 when a high voltage is supplied by the DC-DC converter.

Current and voltage curves of FIG. 7 show simulated current Id and voltage $V_d$ when a voltage $V_{dc}$ of the DC-DC converter 400 is 30 volts, resistance of the resistor R is 1 KΩ and capacitance of the capacitor C is 1 µF. It can be seen in FIG. 7 that when a DC voltage $V_{dc}$ of 30 volts is supplied from the DC-DC converter 400, an initial current flowing into the LC panel is restricted at initial application of the voltage $V_{dc}$. After initial application of the voltage $V_{dc}$, a voltage $V_d$ supplied to the liquid crystal rises to about 93% of the voltage $V_{dc}$ supplied from the DC-DC converter 400 (close to 30 volts), so that a high voltage is supplied to the liquid crystal.

As described above, since the LCD device having the OCB mode according to the present invention further includes the high voltage supplying circuit 500, a high voltage can be supplied to the liquid crystal without modifying the ESD protection circuit, thereby significantly reducing an initial bend transient time of the OCB mode liquid crystal, and an initial spark-like current can be prevented from flowing through the LC panel or the pixel circuit, thereby protecting the LC panel and other elements from damage.

While the present invention has been described with reference to exemplary embodiments thereof, it will be understood by those skilled in the art that various modifications can be made to the embodiments described herein without departing from the spirit and scope of the present invention as defined in the appended claims.

What is claimed is:

1. A Liquid Crystal Display (LCD) device, comprising:
   pixel circuits arranged at crossing points of a plurality of scan lines and a plurality of data lines and including a Liquid Crystal (LC) capacitor of an Optically Compensated Bend (OCB) mode arranged between a pixel electrode and a common electrode;
   an Electrostatic Discharge (ESD) protection circuit connected to each data line and disposed to prevent static electricity from accumulating in each pixel circuit;
   a DC-DC converter adapted to output a voltage for initial bend transition of the LC capacitor of the OCB mode; and
   a high voltage supplying circuit connected between the DC-DC converter and the ESD protection circuit,
   wherein resistance of the ESD protection current decreases only after a predetermined voltage is reached and the resistance depends on the magnitude of the voltage supplied.

2. The device of claim 1, wherein the high voltage supplying circuit comprises:
   a capacitor adapted to charge according to the voltage output by the DC-DC converter; and
   a transistor adapted to output a current that varies according to a voltage charged in the capacitor.

3. The device of claim 2, wherein the high voltage supplying circuit further comprises a resistor connected between the DC-DC converter and the capacitor.

4. The device of claim 3, wherein the voltage charged in the capacitor is given by:

$$vc(t) = (1 - e^{\frac{t}{RC}})V_{dc}$$

where $V_c(t)$ is the voltage charged in the capacitor, $V_{dc}$ is the voltage output by the DC-DC converter, and RC is a time constant.

5. The device of claim 2, wherein the transistor comprises a source connected to the DC-DC converter, a gate connected to the capacitor and a drain connected to the ESD protection circuit.

6. The device of claim 5, wherein the output current of the transistor is adapted to be cut off during a time that the capacitor is being charged.

7. The device of claim 6, wherein the voltage charged in the capacitor is adapted to be supplied to the ESD protection circuit after the capacitor has been completely charged.

8. The device of claim 1, wherein the high voltage supplying circuit is adapted to vary a current supplied to the pixel circuit according to a time that a bend transition voltage of the DC-DC converter is output.

9. The device of claim 8, wherein the high voltage supplying circuit is adapted to have a high resistance upon the bend transition voltage of the DC-DC converter being initially output, and wherein the high resistance of the high voltage supplying circuit is adapted to decrease to a low resistance over time.

10. The device of claim 1, wherein the ESD protection circuit comprises a transistor having a gate and a drain connected and adapted to be turned on upon a voltage of more than a predetermined level being supplied to the gate.

11. The device of claim 10, wherein the ESD protection circuit has a resistance adapted to decrease as the voltage supplied to the gate increases beyond the predetermined level.

12. The device of claim 11, wherein the predetermined level is 10 volts.

13. The device of claim 1, wherein the DC-DC converter is adapted to output a voltage of 15 to 30 volts.

14. The device of claim 1, wherein the data lines are adapted to be connected to ground upon the bend transition voltage being output by the DC-DC converter.

15. The device of claim 1, wherein the LC capacitor is connected in parallel to the ESD protection circuit.

16. The device of claim 1, wherein the pixel circuit further comprises:
 a switching transistor adapted to transmit a data voltage via the data lines to the pixel electrode in response to a selection voltage of the scan lines; and
 a storage capacitor adapted to store the data voltage.

* * * * *